Inventors:
Wolfgang Bäseler,
and Fritz Hofmann,
by Paul E. Schilling,
Attorney.

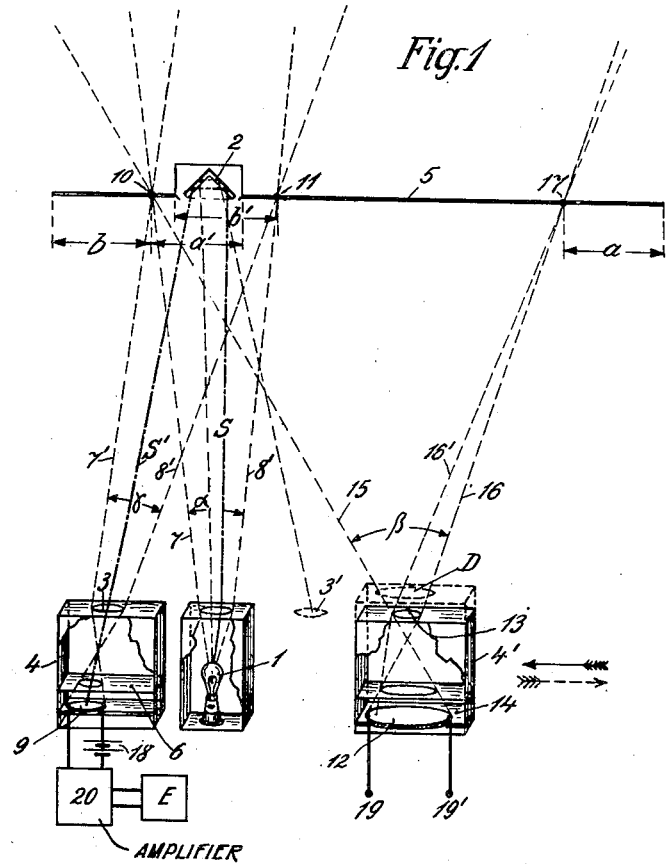
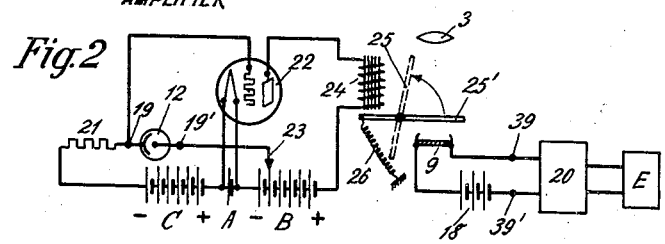
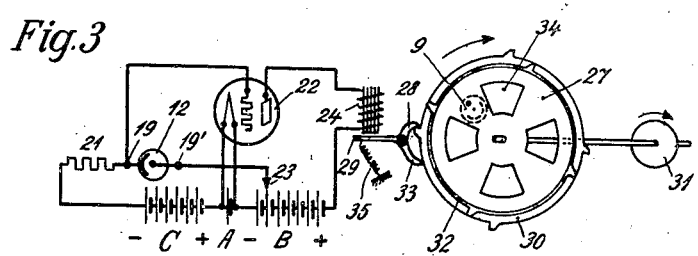

Patented Mar. 29, 1932

1,851,236

UNITED STATES PATENT OFFICE

WOLFGANG BÄSELER AND FRITZ HOFMANN, OF MUNICH, GERMANY

DEVICE FOR THE OPTICAL TRANSMISSION OF SIGNALS

Application filed November 7, 1929, Serial No. 405,521, and in Germany November 9, 1928.

As is well known devices for transmitting optical signals are operated by means of artificial light, acting upon a photo-electric cell and rendering the latter permeable to the current. The current passing through the cell with artificial light is utilized, after it has been intensified by means of an amplifying device, to actuate an optical or acoustic signal or to effect any other action on a vehicle. If for instance it is desired to transmit signals to a travelling train, the photoelectric cell is arranged on the train, while the source of light is either on the track or also on the vehicle. In the latter case a mirror is arranged on the track, which will reflect the light emanating from the source of light on the vehicle to the receiving apparatus. If it is desired to transmit a signal from the train to the track, the arrangement is inverted, that is to say there is on the vehicle either a search-light lit by a receiving apparatus arranged on the track or a mirror, which will reflect the rays coming from the track to a photo-cell sensitive to light provided on said track. In most instances however, it cannot be avoided that the said photo-electric cell is exposed to daylight and under certain circumstances even to the direct rays of the sun. Stray artificial light may also impinge on said cell and cause a wrong action. Therefore arrangements must be provided, which will render ineffective the influence of stray light on the said photo-electric cell.

Various methods have become known for that purpose. The best known method of separating out stray or foreign light consists in that the artificial light utilized for the transmission of signals, is interrupted in quick succession by means of a rotating disc. The connection of the amplifying device is such, that only the voltages resulting from the changing light of a determined frequency will become effective. There is the disadvantage however, that the driving of the perforated disc is imperfect and in the case of selenium cells being employed, which as is known are somewhat slow, there is the further disadvantage that the light during the period of eclipse by the perforated disc is not utilized.

The method according to this invention described hereinafter and serving for the elimination of the undesired action of foreign rays of light shows over the known arrangements the advantage, that the light used for signalling is not interrupted by the eliminating devices and there is also no additional loss of light through optical devices. A further advantage consists in that in consequence of the perfect utilization of the light there may be a saving in amplifying means.

The present invention relates to a device for the transmission of optical signals by means of photo-electric cells and in particular to the elimination of the action of foreign rays of light.

The invention consists in that besides the cell controlling the signalling device an additional cell is provided, which in the presence of foreign rays of light will neutralize the action of the first-named photo-electric cell on the signalling device.

For that purpose a special photo-electric cell exposed to disturbing light is arranged near the receiver, which cell will render inoperative the device for the transmission of signals for such a period as the special cell will receive light, or in some modifications for such a time as rays of light will impinge thereon, for instance ultra-violet rays, which are contained in artificial light to a small extent or not at all, but which are extensively present in daylight. Now, in order to render effective even during day-time the signal lamps or mirrors arranged on the track, these are surrounded by shields or screens of such a size, which will keep off the direct daylight not only from the special cell the so-called locking cell, but also from the photo-electric cells of the signal transmission apparatus proper over a certain travelling distance of the train.

Another modification of the device according to the invention consists in that the sudden impulse-like action of the signalling light on the photo-electric cell producing the signal, is utilized. By using condensers or choke coils the changes of current caused by the sudden illumination of the photo-electric cells, from oscillations occurring gradually, as such are caused by foreign light or through the inconstancy of the cell, may be discriminated.

The arrangement according to the invention is such that besides the photo-electric cell proper a second cell is provided, which possesses as far as possible the same optical visual range as the first-mentioned cell and which is so connected that it will neutralize in general in the presence of foreign light the action thereof on the receiving cell.

In the drawings some practical embodiments of the device according to the invention are illustrated by way of example.

Figure 1 shows diagrammatically a search-light.

Figure 2 illustrates diagrammatically an arrangement for eliminating foreign rays of light.

Figure 3 is a diagrammatic view similar to that shown in Figure 2.

Figure 4:
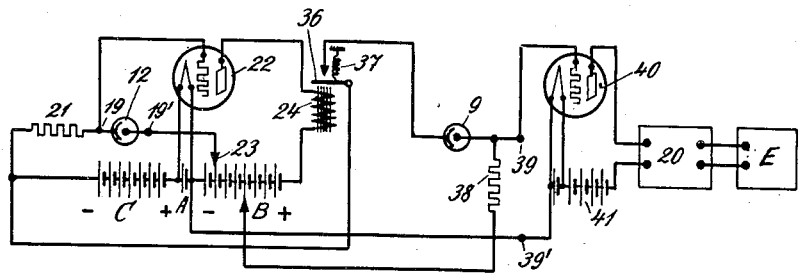
Figure 4 shows diagrammatically another modification according to Figure 2.

Referring in particular to Figure 1, 1 is a search-light and 4 and 4' a receiver each provided with a photo-electric cell. These elements are carried on the vehicle and suitably arranged laterally in such a manner, that they are able to pass during the travel of the vehicle through the visual range of the blind or screen 5 arranged on the track, which blind may consist of a metal screen, and that of the mirror 2.

The light of the search-light 1 forms a cone of rays having an opening angle $\alpha$. As already mentioned, there is provided on the track a mirror 2, which may be constructed as an angular mirror having two reflecting surfaces. The lens 3 in the receiver 4 will project in the latter on the photo-electric cell 9 an image of the plane of the mirror 2 and of the screen 5. In the receiver 4 there is arranged besides a blind 6 over the photo-electric cell 9 in such a manner that only those rays of light situated within the lines 7' and 8' will impinge on the photo-electric cell; while the rays beyond those lines are shielded off. In the slot of the blind or behind it is arranged as already mentioned, the photo-electric cell 9, which through the intermediary of a battery 18 is connected to an amplifying device, so that during the illumination of the cell 9, that is when this latter will permit the passage of current, the latter will be amplified in the amplifying device 20, and by means of the influencing device E connected with the amplifying device it will produce either an optical or acoustic signal, a braking action or a limitation of speed. The rays 7 and 8 emanating from the source of light 1 impinge on the plane of the screen at the points 10 and 11. In these places the external rays 7' and 8' also traverse the plane of the screen. It is possible by this arrangement to conduct the light reflected by the mirror 2 to the cell 9 so long as the said mirror remains within the range of the cone of light produced by the search-light.

A ray of light emanating from the source of light 1 is designated by S and the reflected ray coming from the mirror 2 by S'. Without auxiliary devices the cell 9 would not only act in consequence of the artificial light coming from the source of light 1 and reflected by the mirror 2, but also through daylight or any other foreign light. For eliminating the action of such foreign light there is provided a special photo-electric cell 12 in the receiver 4'. The lens 13 of the latter will produce in the plane of the blind 14 an image of the plane of the screen 5. The slot of the blind is so designed, that only such rays of light can reach the cell 12, which lie within the boundary lines 15 and 16. The boundary ray 15 traverses the plane of the screen in point 10', the boundary ray 16 runs parallel to the boundary ray 8' of the receiving apparatus 4 and traverses the plane of the screen in the point 17. The apparatus connected to the cell 12 and the terminals 19 and 19' renders ineffective the devices belonging to the transmission of signals proper, so long as the cell 12 is illuminated, that is to say when foreign light impinges on the receiving apparatus, which would produce in the latter a wrong action. The manner, in which the cell 12, that is to say the apparatus connected to the terminals 19 and 19' renders ineffective the action of foreign light upon the cell 9 is represented in Figures 2 to 6 and will be explained hereinafter.

In the example shown in Figure 1 the entire cone of rays lies within the lines 15 and 16 having the opening angle, and within the surface of the screen 5. Thus the cell 12 will certainly not receive any daylight. In general, however, the signalling light emanating from the search-light 1 may act partly also on the cell 12. In order to eliminate the action of artificial light on the cell 12 the lens 13 may be of blue color, or, as represented in the drawing, a corresponding color filter D may be arranged in front thereof, which permits only blue or ultra-violet rays to pass. In contradistinction to daylight, artificial light containing no or only few of these short-wave rays, will remain ineffective. But it is not difficult to provide such means, which will shield the cell 12 serving for the elimination of the action of foreign light from the rays of light used for the transmission of signals in such a manner, that the said cell is not touched at all. In the arrangement shown in Figure 1 this is the case. Owing to the property of the angular mirror, having an opening slightly exceeding 90 degrees, the reflected light will go in the direction to encounter the lens 3 either in its full line position when travelling in the direction of the full line arrow in Figure 1 or in its dotted line position as shown at 3' when travelling in the direction of the dotted arrow in said figure only when the train passes below a signalling device, so long as the mirror 2 will remain within the cone of light of the searchlight. This property becomes more marked yet, if a condenser lens is arranged directly in front of the said mirror, which condenser lens will collect and throw all the reflected light upon the lens 3 respectively. The condenser lens is not shown, since it is not absolutely necessary. In practice suitably not an angular mirror, as such is represented in the example for the sake of clearness, is employed but a triple or space mirror as described in U. S. Patent 1,717,752, which will translate the two dimensional properties of the angular mirror into the spatial. Even if in lieu of the mirror 2 self-luminous sources of light are arranged along the track, the cell 12 may be locally so arranged through condensation of the rays emanating from the signalling lights to cones of light, that it will not be touched by the cone of the signalling light when passing the signal. Moreover, dispensing with the color filter will offer the advantage that for the elimination of foreign light the presence of distinctive rays of light in the said foreign light is not necessary, so that also the influence of strong artificial foreign light will be neutralized. The necessary size of the screen 5 follows from the consideration, that the cone of light 15, 16 having the opening $\beta$ must impinge on the said screen so long as the cone 7' and 8' having the opening $\gamma$ impinges upon the mirror 2. As may be clearly seen in the drawing the said screen must be extended by the distance $a$ beyond the point 17 and by the distance $b$ beyond the point 10, assumed that the direction of travel lies in the plane of the drawing and assumed that the vehicle moves from the right to the left side. These distances may be obtained by arranging the lamp 1 as in Figure 1 and measuring the distances between respective edges of the light cone and the opposite edges of the mirror opening as at $a'$ and $b'$ and using the distances $a'$ and $b'$ to lay off the respective distances $a$ and $b$.

It also follows from the drawings, that objects of any size, which are distanced just as far or even farther than the screen 5, will cause no disturbing effects whatever, since the cone of light 15, 16 will enshroud the cones 7', 8' up to an infinite distance. Outside of the distance of the screen from the receiving device the cone of rays become slightly extended, this fact however is not considered in the drawings for the sake of clearness, since in principle no changes will be caused thereby. As an example of the way these rays diverge at distances greater than the distance to the screen, the rays 16, 16' are extended beyond the screen in Figure 1.

In order to provide in practical constructions for reasons of safety, for inaccuracies caused by the swaying of the vehicle or the like, the opening angle $\beta$ and the screen 5 are chosen of bigger size, than will be necessary according to the specifications mentioned above. With a moderate enlargement it is however necessary yet, that the reversing devices for the transmission apparatus operate practically without any inertia. If apparatus is used possessing only a moderate inertia, particularly the screen must be further enlarged on account of the high travelling speed of the trains, which however, will offer no difficulties. With a direction of travel from the left to the right side, for instance the screen must be extended towards the left side to such a degree that the cone of rays $\beta$ rests at least completely on the screen prior to the contact between the cone of rays $\gamma$ and the mirror 2. Towards the right side the screen must be extended and the cone of rays $\beta$ be opened to such a degree that the ray S' will not leave the screen until it has sufficiently illuminated the cell 12.

Figure 2 shows an arrangement for eliminating foreign light. The locking cell 12 is connected by way of the resistance 21 with the batteries C, A and a portion of B. Said resistance 21 is so designed, that the tube or valve 22, which is heated from the battery A, receives so much negative pressure with a non-illuminated cell 12, that no anode current can pass. If the cell 12 is illuminated, its resistance becomes smaller and the current will pass through said cell. In consequence the grid potential will shift to the positive side, so that with the proper selection of the tapping 23 of the battery B an anode current can pass. The relay 24 shown in the anode circuit will thus attract its armature 25. As the latter is pivotally attached and carries a covering flap 25', the photoelectric cell 9 situated beneath said flap is covered, so that the light passing through the lens 3 cannot impinge on the cell 9. The arrangement described last is built in a suitable manner into the receiving apparatus 4 of Figure 1. As already mentioned the cell 9 is connected with an amplifying device 20 by way of the terminals 39 and 39'. So long as foreign light impinges on the cell 12 arranged within the receiver 4' as shown in Figure 1, so long will be suppressed any transmission of signals by way of the cell 9.

If the illumination of the cell 12 ceases, the anode current of the tube 22 will drop again and the relay 24 will disengage its armature 25. The latter is carried to its position of rest by means of the spring 26 and as the covering flap 25' will open the path for the passage of the rays of light to the cell 9, it renders the latter ready for reception. On account of its small inertia the relay 24 will have to be designed according to the polarized or dynamometrical system. If necessary instead of a tube 22 a multi-step amplifying device may likewise be employed.

In the example shown in Figure 3 the arrangement of the photo-electric cell 12, the tube 22 and the relay 24 is the same as in Figure 2. The armature 29 controlled by the relay 24 effects again—as in Figure 2—a mechanical covering of the photo-electric cell 9. The armature 29 is hingedly connected and carries two pawls 28 and 33. For covering serves a perforated disc 27, which in the position represented will withhold from the cell 9 the rays of light coming from the lens. The said perforated disc is provided at its outer periphery with two gear wheels. Through the external gear wheel 30 and the pawl 28 on the armature 29 and disc 27 is prevented from turning in the direction of the arrow. The disc has a permanent tendency to rotate in the direction of the arrow, which for instance can be by means of a spring, a friction clutch, an electric motor with interposed spring (31) or the like. In the position shown the relay 24 is traversed by current, the cell 12 being loaded by foreign light, as described with reference to Figure 2. When the illumination of the cell 12 ceases the spring 35 will attract the armature 29 releasing thereby the perforated disc 27, which was prevented from turning by the pawl 28, so that said disc may rotate to such an extent, until it is stopped again by the pawl 33 engaging the wheel gear 32. The said perforated disc will thus move forward by one fourth of a rotation and a perforation 34 of the perforated disc comes to rest above the photo-electric cell 9, so that the latter can receive light and transfer a corresponding action to the device influencing the travel of the train. The advantage of this arrangement in view of that shown in Figure 2 is to be seen in that the relay 24 will have to produce only slight controlling forces. The double gear wheel will ensure under all circumstances synchronism between the armature 29 and the perforated disc 27.

The mechanical arrangements according to Figures 2 and 3 however possess the small drawback of the inertia, but their advantage lies in that even the strongest degree of foreign light, for instance the direct rays of the sun, will produce no exhaustion of the cell 9.

In the device according to Figure 4 the influence of foreign light on the cell 9 is neutralized in that said cell is disconnected from its source of voltage by means of the contact 36, if foreign light impinges upon the signal receiving apparatus.

The connection of the locking cell 12, the tube 22 and the winding of the relay 24 is again the same as that shown in Figures 2 and 3. During illumination of the cell 12 the relay 24 is energized and attracts the armature 36, whereby the circuit of the cell 9 is interrupted, which circuit is closed by way of a resistance 38, a portion of battery B, and the batteries A and C. To the terminals 39 and 39' is connected the first tube 40 of the amplifying apparatus, which is in connection with the further amplifying device 20 by the interposition of a battery 41. Only when the contact 36 is closed by the spring 37, that is when the cell 12 no longer receives any foreign light, the cell 9 is ready for reception and on being illuminated it can produce a change of the anode current of the first amplifying tube 40 and in consequence it may produce a corresponding action on the influencing device.

Figure 5:
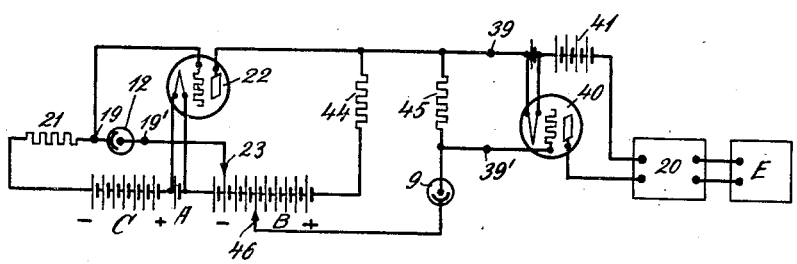
Figures 5 and 6 are diagrams of the connection for preparing the transmission of signals.
Figure 6:
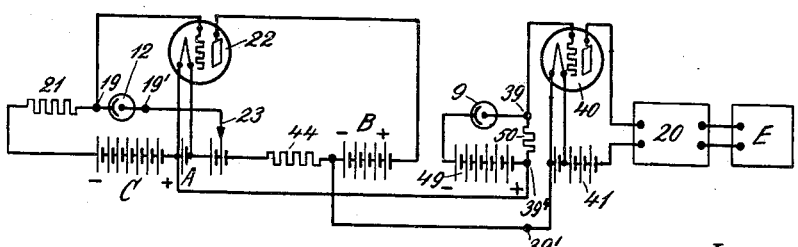

Figures 5 and 6 show two examples, in which the preparation of the readiness for the transmission of signals with the use of photo-electric cells is carried out practically without inertia. The connection of the photo-electric cell 12 and the tube 22 is again the same as in the figures described before. Through the resistance 44 passes in the examples represented in both figures the anode current of the tube 22, if the locking cell 12 receives foreign light.

In Figure 5 the receiver cell 9 for the signalling light is connected with the voltage of the points 23 and 46 by the interposition of the resistance 45. The tapping 46 of the battery B is so chosen, that the total voltage between 46 and 23 is compensated during the illumination of the cell 12 through the anode current of the tube 22, that is to say it is equal or almost equal to zero, whereby the circuit of the cell 9 becomes void of tension. If the illumination of the locking cell 12 now ceases, with the anode current of the tube 22 also the drop of voltage at the resistance 44 will disappear, so that now the battery pressure between 46 and 23 by way of the resistances 44 and 45 will be set up as feeding voltage for the circuit of the cell 9 and prepare the latter ready for the transmission of signals. In parallel to the resistance 45 there is connected to the terminals 39 and 39' the entry to the amplifying device for the transmission of signals, which is indicated by the tube 40. In consequence the cell 9 can only act in the direction of the influencing device owning to an illumination through the signal light.

In the example according to Figure 6 the circuit of the cell 9 possesses its own feeding battery 49. The connection of the first amplifying step 40 for instance is similar to that in the preceding examples, the anode current of the tube 40 being suppressed. The tube 22 only influences the pressure of the terminal 39'' towards the heating thread of the tube 40.

If the cell 12 is not illuminated, if the resistance 44 practically is void of current, the terminal 39'' has approximately the potential of the heating thread of the tube 40. The latter is thus ready for reception. If the cell 12 is energized by foreign light, the terminal 39'' will receive through the anode current 22 in the resistance 44 a positive voltage, which is sufficient, in order to maintain the anode current of the tube 40 even during the illumination of the cell 9. Even in this instance a transmission of signals is thus only possible, if light coming from the signalling lamp 1 or from the mirror 2 (Figure 1) impinges upon the cell 9.

In the devices described hereinafter the influence of foreign light on the photo-electric receiving cell is neutralized in that said cell will only produce an action on the influencing device in the case of a sudden impulse-like illumination, as such is the case when travelling through the cone of the signal light. In this instance the screen 5 required in the influencing devices shown in Figures 1 to 6 becomes superfluous.

Figure 7:
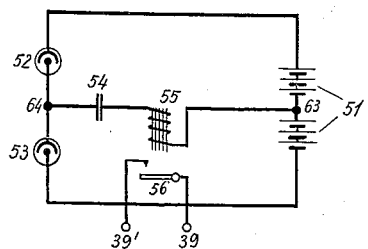
Figures 7 to 19 represent diagrammatically a number of connections according to this invention.

Figure 7 represents a basic connection, in which only sudden and impulse-like impinging light can produce an action of the influencing device, such as is the case with the signalling light. 51 represents a source of voltage, 52 and 53 are two photo-electric cells connected in series with the battery 51.

To the bridge between the terminals 63 and 64 is connected a condenser 54 to which the winding of a relay 55 is connected in series. One of the two cells serves as signalling cell and the other one as locking cell. The appurtenant lens is so designed that the signalling light can materially only impinge upon one photo-electric cell, while foreign light will illuminate both cells. A known means for the local condensation of the signalling light is for instance, as already mentioned a so-called triple mirror, which is also employed with the transmission of optical signals. The connection represented here is a special construction of a bridge connection. A neutralization of the impressions received by the two cells with a standard bridge connection as is well known can be always obtained where the cells 52 and 53 are perfectly alike or possess at least potential characteristic, that is to say if the conductivity of the two cells is proportionate in dependency of the quantity of light impinging thereon. The particular advantage obtained by the application of the principle of impulse-like illumination in view of the known bridge connections consists in that it is not necessary to equalize these bridges and that in addition slow changes of current, caused by the gradual change of the intensity of light impinging on the cells, produce no influence.

For instance the points 63 and 64 may readily possess a different potential, the relay 55 connected by way of the capacity 54 will nevertheless only become energized, if the potential between the points 63 and 64 changes impulse-like. The relay 55 sensitive to current will react on the sudden charging current of the condenser 54 and close for instance a contact 56, which—as already described in connection with the preceding examples—is connected with the amplifying device by way of the terminals 39 and 39' and will thus control the amplifying device.

Figure 8:
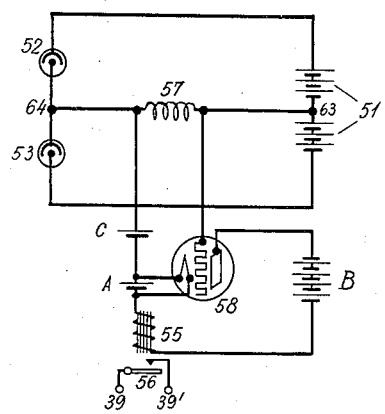

Figure 8 represents the same bridge connection, differing only in that in the bridge between the terminals 63 and 64 a choke coil 57 is inserted. In parallel to the latter is connected a relay sensitive to voltage, which as shown in the drawings, may be an electronic tube 58, which in the customary connection in the anode circuit contains a relay winding 55.

If now for instance the cell 52 is illuminated impulse-like, the potential difference occurring between the points 63 and 64 cannot be compensated at once over the choke coil 57 and in consequence an increase of the grid pressure of the tube 58 caused by the battery C will take place. In consequence the anode current of this tube will rise, it will close the contact 56 and the relay 53 and cause through the amplifying device connected to the terminals 39 and 39' a control of the vehicle.

Figure 9:
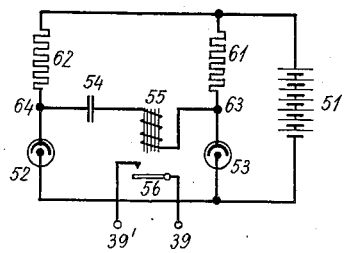

In Figure 9 are in parallel to the source of voltage 51 a resistance 61 and the photo-electric cell 53, which are connected in series. Likewise parallel to the source of voltage 51 are situated the resistance 62 and the photo-electric cell 52, which again mutually are connected in series. To the points 63 and 64, as shown in Figure 7, are connected the condenser 54 and the relay 55 controlling the contacts 56. The action of this arrangement is the same as that illustrated in Figures 7 and 8.

The point of connection 63 in Figures 7 and 8 may also be shifted from the centre of the source of tension 51 to the end of the latter without causing any change in the efficiency of these devices. This will lead to the connection according to Figure 10, in which are connected in parallel to the source of voltage 51 the photo-electric cells 52 and 53 connected in series. To the points 63 and 64 is again connected the signalling device, which has been already described.

If heretofore mention was made that the action of the signalling cell was neutralized by means of a special locking cell, in general it is not necessary to increase the number of cells employed for the various transmissions of signals, since these cells in consideration of the triple mirror referred to can be arranged in pairs and so each signalling cell acts as locking cell to the other signalling cell to which it is allotted.

If both cells receive light simultaneously, they will mutually neutralize their actions. If only one or the other receives light, which is the case, when any signalling light impinges on the receiving device, there will occur in the blind resistance, which was represented in the examples mentioned as capacity or inductivity, the action of one or the other sign, which can be transferred through corresponding devices, for instance relays.

Figure 10:
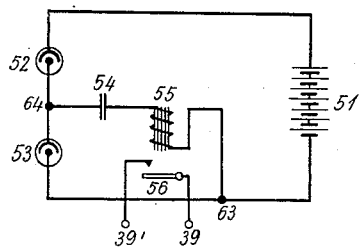
Figure 11:
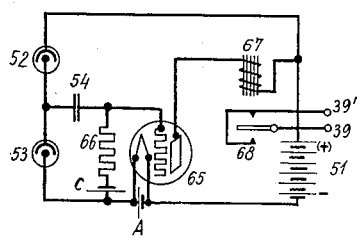

Figure 11 shows such an arrangement, which for the rest in principle is alike that shown in Figure 10. In the non-influenced state the amplifying tube 65 will supply a mean anode current, since the grid of that tube is constantly under tension by way of the resistance 66. The relay 67 inserted in the anode circuit of the tube 65, is so dimensioned that in the event of a mean anode current passing, the armature of said relay will rest just in the central position between the two contacts 68. If another potential is supplied impulselike to the point 64 this action will be transmitted by way of the condenser 54 to the grid of the tube 65 and here it will cause either an increase of the intensity of the anode current to a higher value or its interruption, just according to the sign of the current. The armature of the relay 67 which as mentioned rests in the central position with a normal anode current, will close one contact during the rising and the other contact 68 during the drop of the anode current and thus close the circuit of the amplifying device connected to the terminals 39 and 39'. The action of the change of the potential at the point 64 upon the anode current of the tube 65 is different for that reason, since just according to the cell 52 or 53 being illuminated impulse-like, an increase or decrease of pressure will occur in the circuit of the grid.

In lieu of the relay 67 suitably two standard relays may be provided, which are so connected that the armature of one relay is attracted at half the value of current while the armature of the other relay has dropped off. If the current is increasing to its full value also the second relay will attract its armature, if however the current is decreasing to a very small value or if it drops to zero, the first relay will likewise drop its armature. By means of this connection it is easily possible to mark whether the cell 52 or the cell 53 was illuminated impulse-like. With this arrangement however there is a certain difficulty. Suppose the cell 52 has just become illuminated by entering suddenly into the cone of signalling light. As intended, the point 64 and in consequence the grid of the tube 65 will get a higher potential. If the cell 12 is again leaving the cone of light with sufficient speed, the potential of the grid could not be sufficiently compensated by way of the grid resistance 66 nor by way of the resistance of the condenser 54. If therefore the point 64 will return to its former potential after leaving the cone of light, also the potential of the grid of the tube 65 will approximately assume the former value. If however the cell 52 remains incidentally within the cone of light for a longer period, the potential of the grid will be compensated by way of the condenser 54 and the resistance 66. If no other steps are taken the armature of the relay 67 would thus again return to its position of rest. If now the cell 52 leaves the cone of light, that is to say if the potential of the point 64 decreases again to the original value, which it possessed prior to illuminating the cell, the grid potential of the tube 65 will become more negative approximately about the same value by which it had become more positive previously. The disappearance of the light impinging on the cell 52 in this instance will act accurately in the same way as if an illumination of the cell 63 had taken place impulse-like, that is to say, there is again an influencing of the vehicle, since the armature of the relay 67 has shifted to the other contact.

In order to overcome these difficulties, the arrangement in using two relays may be carried out in such a manner, that the armatures are locked in the end positions thereby blocking the actions referred to above of the opposite sign.

Figure 12:
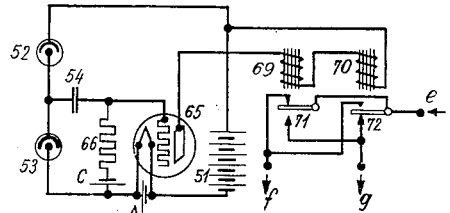

Figure 12 shows a connection of this type, which for instance is exemplified as a closed circuit connection—substantially the connection is the same as that shown in Figure 11. The anode current of the tube 65 however flows here through the windings of two relays 69 and 70. The armatures of the relays 69 and 70 are so arranged, as described above with reference to Figure 11. The position of the armature of these relays may correspond to the central position of the armature of the relay 67 in Figure 11. If now for instance the armature of the relay 69 is dropped on account of the cell 53 entering the cone of the signal light, it will interrupt the closed circuit $e-f$ closing thereby a contact 71, parallel to the contact 72, which is closed in the position of rest by the armature of the relay 70. If the relay 70 attracts later on its armature after leaving the cone of light, since in this instance the reversal of the anode current in the opposite direction is effected as during the entering of the cell in the cone of light, nothing will be changed in the circuit $e-g$. The armatures of the two relays, locked in their end positions are returned into their inoperative position by means of a returning device, whose retardation for instance is dependent on the path of light over which the locomotive has traveled.

With the connection described above the tube 65 is traversed in a normal case by a mean anode current and the two relays 69 and 70 will become energized at an alteration of this current.

Figure 13:
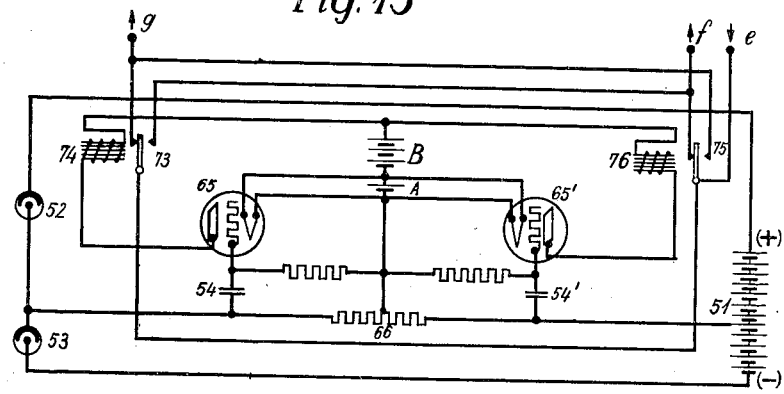

For reasons of the safety of service it is desirable however, to operate with connections in which the current will fluctuate between zero and a determined final value, since by this the reliability of the energization of a relay is essentially increased. Such a connection is represented in Figure 13. 52 and 53 are the two photo-electric cells, which are connected to the source of current 51. The resistance 66 situated in the bridge portion of this arrangement is tapped in the centre and controls by way of the condensers 54 and 54′, which are in connection with the grid of the tubes 65 and 65′, the anode current of the same. Into the anode circuit of the tube 65 is inserted the winding of a relay 74, while in the anode circiut of the tube 65′ the winding of the relay 76 is situated. Under normal circumstances the two tubes 65 and 65′ have full anode current prescribed by their cathodic potential. During the illumination of the cell 52 the current in the tube 65 will maintain its full value, but in the tube 65′ however it will be choked, causing the armature of the relay 76 to drop and closing a second contact 75. The difficulty encountered with the connection according to Figure 11, if the illuminated cell remains within the cone of light for a longer period, is to be found here too, however it may be overcome in the same manner as indicated with reference to Figure 12.

The contacts 73, controlled by the relay 74 and the contacts 75 actuated by the relay 76 as well as the armatures of both these relays are consequently connected in the same manner as described in the preceding mode of execution.

When using the already mention triple mirror for the local collection of the signalling light there are obtained in consequence of the peculiar optical properties of said mirror not only one but two reflected bundles of rays or luminous spots respectively. If the utilization of these two bundles of light is discarded, making use of one the space becoming thus available may be employed for the accommodation of locking cells. In that case there are more cells but the receiving apparatus need not be made larger than before. Only the connection is to be effected in such a manner that the illumination of the locking cell alone (by the signalling light) will cause no action.

Figure 14:
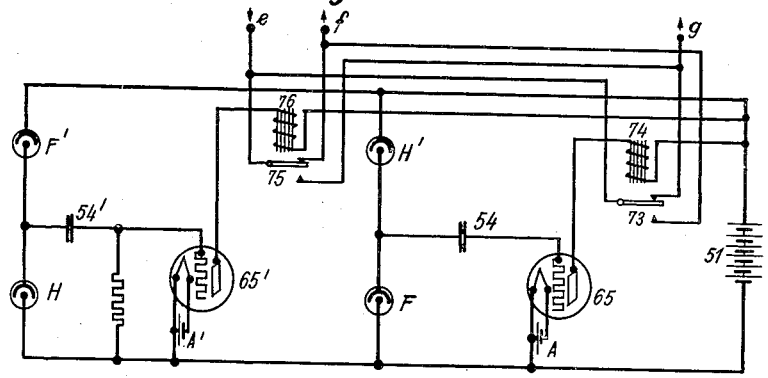

Figure 14 illustrates a connection of that type. The mirror illuminating the signalling cell F also illuminates simultaneously the locking cell F′. An illumination of F causes in known manner a decrease of the anode current of the tube 65 effecting thereby the dropping of the relay 74. An illumination of F′ has no further consequences, since it will effect at all events only an increase of the anode current of the tube 65′, which in no case will cause an energization of the relay 76.

If sending the signal to the cell H the armature of the relay 76 will drop in an analogous manner, while the armature of the relay 74 remains attracted. The connection of the contacts 73 and 75 allotted to the relays 74 and 76 is effected in a manner analogous to that illustrated in Figure 13.

Figure 15:
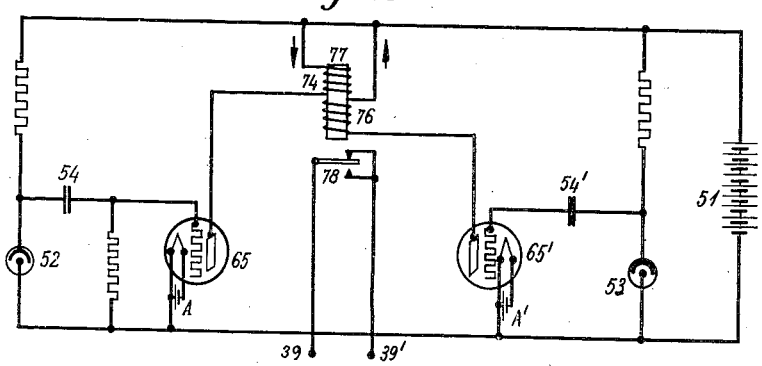

With the connections treated so far it was necessary that the characteristic of the cells mutually neutralizing each other, are at least proportional to each other within the whole range of the changes in illumination occurring. If behind the cells electronic tubes are arranged the neutralization of the two actions may also be carried out in the circuit behind these tubes. By means of these connections additional advantages may be obtained. Figure 15 shows such a connection. The cell 52 will affect the anode current of the tube 65 passing through the winding 74. In the same manner the cell 53 will influence the anode current of the tube 65′ passing through the winding 76. Both windings 74 and 76 are mounted on the common permanent magnet (or polarized relay) 77, which keeps the armature 78 attracted in the normal case. The action of the two windings during the illumination of the appurtenant cells is opposed to one another. In particular the magnetizing action of the winding 74 belonging to the signalling cell 52 is equal to that of the magnet 77. In the non-influenced state the normal anode currents of the respective tubes pass through both windings.

If both the cells 52 and 53 are illuminated in the same manner, the current in both windings will be reduced in the same manner and the armature 78 remains attracted. If on the contrary only the signalling cell 52 is illuminated, only the current of the winding 74 is reduced and the magnet 77 now weakened through the winding 76 will drop its armature 78. The advantage of this neutralization behind the amplifying tubes is to be seen in that the controlled and mutually neutralizing anode currents can fluctuate only within certain definite limits. The controlling cells must agree in their characteristics only to such an extent as will be necessary for controlling said range. Beyond said range they may disagree extensively, without impairing thereby the operation of the connection.

Working in this direction it is possible to become as independent as possible of the particular course of the characteristic of the cells and to proceed to connections in which the action of the signalling cell is not properly neutralized, but locked. A simple locking free of inertia may be obtained in particular through influencing the grid or anode pressure of the amplifying tubes arranged behind the signalling cell. It is not necessary however to limit oneself to a locking exempt from inertia, if a certain precaution is taken in erecting the signals, in that these are not positioned close to objects casting shades, which for instance may cause rapid changes of the daylight.

In that case a locking will be sufficient effected through mechanical rapidly operating relays. Naturally also the influence of the signalling cell on the apparatus in the rear thereof must then be retarded in a corresponding manner.

Figure 16:
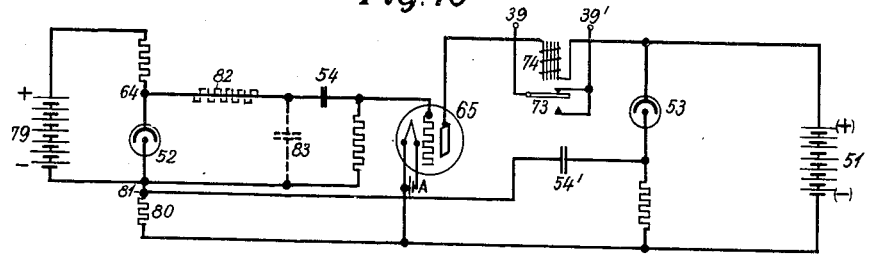
Figure 17:
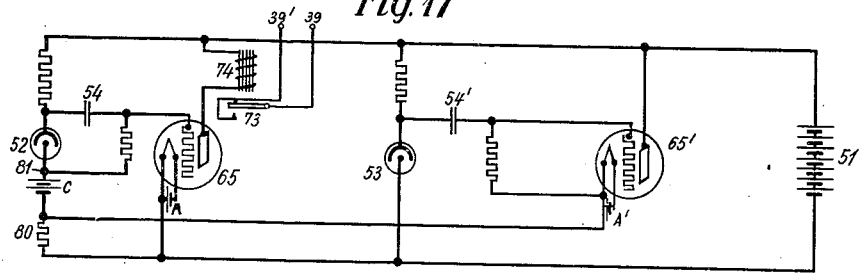
Figure 18:
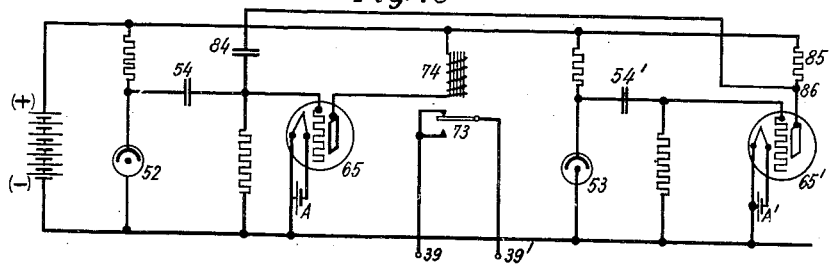

In the connections shown in Figures 16, 17 and 18 examples are illustrated, which refer to the above mentioned locking free of inertia. These connections operate in such a manner that during an impulse-like illumination of the signalling and locking cell the latter will effect a locking action in the manner referred to above. If the signalling cell is only illuminated impulse-like, the normal effect will occur, and an impulse-like illumination of the locking cell will remain without any further consequences.

In Figure 16 for instance 52 is the signalling cell which influences the anode current of the tube 65 passing through the winding 74 of the relay, and an illumination of the cell 52 causes a reduction of the potential of point 64 and in consequence a reduction of the anode current of the tube 65. In the normal case the resistance 80 is void of current, therefore point 81 possesses the same potential as one end of the heating thread and consequently the connection is perfectly in agreement with the connections formerly referred to.

If however the locking cell 53 is illuminated, the charging current of the condenser 54′ will pass through the resistance 80, and the potential of the point 81 shifts to the positive, so that the change of the potential of the point 64 will cause no reduction of current of the tube. By means of the resistance 82 shown in hatched lines in the drawing and by the condenser 83 it is possible to slightly retard the control of the tube 65 through the cell 52 opposite the locking caused by the cell 53, so that the grid will be already locked, before the cell 52 can act thereon. This temporal displacement can naturally also be effected through a correspondingly connected inductivity.

The connection according to Figure 17 perfectly corresponds to that shown in Figure 16, only the locking cell 53 does not directly act on the resistance 80, but through the intermediary of tube 65 connected therewith. This renders possible that the resistance 80 may be employed simultaneously for the locking of a number of signalling cells, of which only cell 52 is shown.

Figure 18 shows a different manner of locking. Here too it is possible to lock, by means of a single locking cell 53, a large number of signalling cells, of which again only the signalling cell 52 is shown in the drawing. This is effected in that to the grid of the tube 65 there is connected in the same way as in the other examples, the condenser 54 and the somewhat smaller condenser 84.

The other side of this condenser 84 is influenced by the voltage drop formed through the anode current of the tube 65′ at the resistance 85. The mode of operation of the whole arrangement is then as follows: An illumination of the signalling cell 52 causes a reduction of the anode current of the tube 65 and in consequence the dropping off of the armature 73. If the cell 53 is illuminated at the same time, the anode current of tube 65′ will be also reduced, the potential of the point 86 will shift strongly to the positive and this causes by way of the condenser 84 that the grid of the tube 65 becomes so highly positive, that the influence of the cell 52 is without any importance.

An analogous capacity locking can be obtained, in that the potential of the point 86 is caused to act upon a special second grid of the tube 65.

Naturally instead of the capacity influence of the grid of the tube through the condenser 84 also an inductive influencing may be employed.

All the connections mentioned here, particularly those according to Figures 16, 17 and 18 show the advantage that one becomes independent to a wide extent of the inconstancy of the cells.

If these connections are used for the transmission of signals to or from moving objects, for instance from the track to travelling trains or vice versa, it follows in general already through the passing of the signal, that the light of the latter will act on the light-sensitive cell at a certain minimum velocity.

By the means mentioned it is possible to render ineffective slower changes. The conditions for the compensation or the locking grow less favorable, if it is prescribed, that an action of the signalling light is also to take place at very low speeds; however this difficulty may be overcome, if the signalling light is chopped up in any regular or irregular manner, for instance by placing in front thereof a perforated disc or by alternating connections or disconnections or similar means. This chopping up may be carried out either permanently or also, which may be preferable, by arranging for this chopping to take place only at a slow speed of the train, while during the higher speeds of the train the signalling light is radiated constantly. There accrues then the advantage, that the number of light impulses per second may be reduced and in consequence one is less dependent on the action of the inertia occurring for instance with selenium cells.

In the examples mentioned simple blind resistances were used for discriminating the influencing of the cells by means of signal light impulses opposed to other influences occurring at a slower rate. It is not possible to obtain thereby an absolutely strict limitation in particular, since for reasons of safety normally with a multiple excess of signalling light must be operated.

Figure 19:
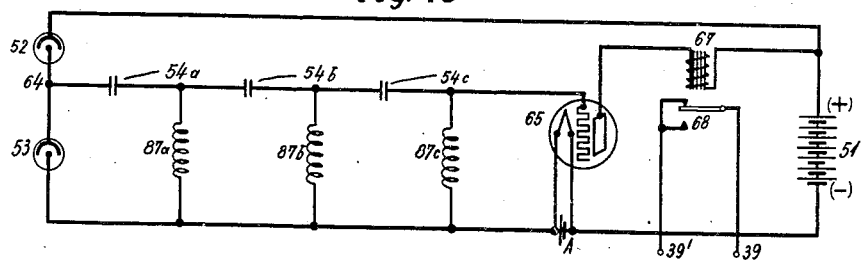

Therefore foreign light having about the intensity of the normal signalling light or being even higher than that, will be active even beyond the simple blind resistances even if the impulse due to the effect of such light is slower than the slowest signalling light. The limit of the minimum speed, which thus also depends on the amplitude of the strongest influence, is reduced thereby. As however the task of the elimination of foreign light is facilitated by compensation or locking, if the minimum speed lies too high, a more stringent limitation of the minimum speed at a smaller variation from the limit of the amplitude is desirable. This is attained by the use of sieve-chain like combinations of resistances in lieu of the simple blind resistances. A sieve-chain consisting of a series of condensers with transversely connected choke coils for an instance has the property of permitting the passage of an impulse-like change of voltage only, if it occurs at a certain minimum velocity determined by the elements of the chain. The sieve-chain behaves in this instance in a manner similar to alternating voltages, which are only passed above a determined limiting frequency. Figure 19 for instance represents such a supplement to the connection according to Figure 11. The condenser 54 in Figure 11 is replaced in Figure 19 by the chain consisting of the condensers 54a, 54b, 54c and the choke coils 87a, 87b, 87c. Obviously all other examples may be supplemented in this sense.

In concluding it may be pointed out that the methods referred to herein may be combined with all other methods for the elimination of foreign light obtaining thereby a substantially increased safety.

We claim:

1. In combination with a train signalling system, a photo-electric cell for signal operation, a second photo-electric cell, means operative by said second cell when same is illuminated for rendering said first cell inoperative, and light shields constructed and arranged along the path of travel of the train for shielding light from said first and second cells, said shields being positioned at points where the transmission of signals is to be effected.

2. In combination with a train signalling system, a photo-electric cell for signal operation, a second photo-electric cell, means operative by said second cell when same is illuminated for rendering said first cell inoperative, and a light filter for said second cell which restricts the passage of light used for signalling purposes and permits passage of other extraneous light.

3. In combination with a train signalling system, a photo-electric cell for signal operation, a second photo-electric cell, means for rendering said first cell inoperative when said second cell is illuminated, and means for projecting a conical light beam on one of said cells.

4. In combination with a train signalling system, a photo-electric cell for signal operation, a second photo-electric cell, means operative by said second cell when same is illuminated for rendering said first cell inoperative, means for restricting the visual range of said first cell to predetermined limits, and means for restricting the visual range of said second cell to predetermined limits which encompass the visual range of the first.

5. In combination with a train signalling system, the combination of a photo-electric cell for signal operation, a second photo-electric cell, and means operative by said second cell when same is illuminated for protecting said first cell against illumination.

6. In combination with a train signalling system, a photo-electric cell for signal operation, a second photo-electric cell, a rotary shutter for said first cell, means for constantly urging said shutter to rotate in one direction, and means operative by said second cell for permitting and restraining rotation of said shutter.

7. In combination with a train signalling system, a plurality of photo-electric cells, means including an electric surge preventive device for operating a signal upon a variation in the intensity of illumination of one or the other of said cells, said surge preventative device being proportioned to permit operation of the signal only when the resistance of the cells varies at a certain predetermined velocity.

8. In combination with a train signalling system, a photo-electric cell for signal operation, a second photo-electric cell, means for rendering said first cell inoperative when said second cell is illuminated, and means for rendering said cell or cells inoperative by quick changes of illumination.

9. In combination with a train signalling system, a photo-electric cell for signal operation, a second photo-electric cell, means operative by said second cell when same is illuminated for rendering said first cell inoperative, and means for retarding the signal operation of said first cell until said second cell has had time to operate.

10. In combination with a train signalling system, a photo-electric cell for signal operation, a second photo-electric cell, means for neutralizing the action of said first cell when the second is illuminated, and means for exposing said cell or cells to illumination at predetermined spaced intervals.

In testimony whereof we have affixed our signatures.

WOLFGANG BÄSELER.
FRITZ HOFMANN.